United States Patent [19]

Kumazawa

[11] 4,112,026

[45] Sep. 5, 1978

[54] BUBBLE GENERATING APPARATUS

[75] Inventor: Toshiharu Kumazawa, Fujisawa, Japan

[73] Assignee: Mitsubishi Precision Co., Ltd., Japan

[21] Appl. No.: 727,275

[22] Filed: Sep. 27, 1976

[30] Foreign Application Priority Data

Nov. 4, 1975 [JP] Japan .................................. 50-131405
May 27, 1976 [JP] Japan .................................. 51-060559

[51] Int. Cl.² ............................................. C02D 1/04
[52] U.S. Cl. ...................................... 261/29; 261/117;
 261/123; 261/DIG. 75; 239/420; 239/515
[58] Field of Search ............... 239/101, 102, 418, 420,
 239/421, 515, 545; 261/28, 29, 36 R, 123, 117,
 118, DIG. 75

[56] References Cited

U.S. PATENT DOCUMENTS 3,278,170 10/1966 Moritz ................................. 261/29
3,951,344 4/1976 Wilson ................................ 239/421

FOREIGN PATENT DOCUMENTS

231,656 1/1910 Fed. Rep. of Germany .......... 239/421

Primary Examiner—Robert W. Saifer
Attorney, Agent, or Firm—Merchant, Gould, Smith, Edell, Welter & Schmidt

[57] ABSTRACT

An apparatus for generating bubbles in a liquid is disclosed which has a liquid spouting nozzle element for violently spouting a pressurized liquid, an impact disperser for generating a dispersion stream of the pressurized liquid directed into the liquid surrounding the impact disperser when the spouted pressurized liquid impinges upon the disperser and a gas supplier for supplying and guiding a stream of gas to a region surrounding the impact disperser thereby causing the gas stream to be dragged into the dispersion liquid stream. The gas dragged into the dispersion liquid stream is dispersed in the liquid and converted into fine bubbles.

9 Claims, 9 Drawing Figures

Fig. 8

BUBBLE GENERATING APPARATUS

FIELD OF THE INVENTION

The present invention relates to a bubble generating apparatus, and more particularly relates to a bubble generating nozzle unit having a liquid spouting opening and being adapted for use in attaining a good gas-liquid contact or gas-liquid agitation mixing by generating gas bubbles in a liquid and dispersing the bubbles in the liquid.

BACKGROUND OF THE INVENTION

Diverse bubble generating apparatus are known. In one known apparatus, a method is employed in which a compressed gas is injected through fine holes into a liquid so as to cause growth of bubbles containing therein the compressed gas. In another known apparatus, a nozzle device is employed in which a gas or a gas-liquid mixture is directly injected from a nozzle means but no means for causing collision and dispersion of a liquid is provided. In a further known apparatus, a rotary cylindrical element rotating at a high speed in a liquid is used in which a gas is fed into the rotary cylindrical element so as to cause dispersion of fine bubbles through the wall of the rotary cylindrical element. According to any of these known apparatus, however, it is difficult to generate bubbles having sufficient fineness for attaining gas-liquid contact to a desired degree and it is also difficult to appropriately set the angle of dispersing the stream of gas bubbles or the bubble-contained liquid into the liquid. Further, when the rotary cylindrical element rotating at a high speed in a liquid is employed, provision of a shaft-sealing device is indispensable and this device involves such defects as difficult maintenance and short life.

SUMMARY OF THE INVENTION

It is, therefore, an object of the present invention to provide a bubble generating apparatus whereby the above-mentioned difficulties encountered with the known bubble generating apparatus are obviated.

It is another object of the present invention to provide a bubble generating apparatus of the type having a liquid spouting nozzle element whereby, even if a foreign substance is contained in the liquid spouted from the liquid spouting nozzle element, obstruction or clogging is not caused in the nozzle element, the risk of abrasive damage of the nozzle element is completely eliminated and the life of the apparatus is extremely prolonged over those of the known apparatus.

In accordance with the present invention, there is provided an apparatus for generating bubbles in a liquid, which comprises, in combination: a nozzle element having a liquid inlet for introducing therein a pressurized liquid and an outlet arranged to be spaced apart from the liquid inlet for spouting the pressurized liquid; an impact disperser means having a liquid impinging surface for causing a stream of the pressurized liquid spouted from the outlet of said nozzle element to impact against said impinging surface and for generating a dispersing stream of said pressurized liquid directed into the liquid, thereby forming a low pressure region in said liquid around the dispersing stream of said pressurized liquid, and; a gas supply means for supplying and guiding a gas to a region surrounding the impact disperser means, thereby causing said gas to be dragged into the low pressure region in said liquid.

Preferred embodiments of the present invention are hereinafter described, by way of example only, with reference to the accompanying drawings wherein.

It should be noted that throughout the drawings showing five preferred embodiments of a bubble generating apparatus of the present invention, like reference numerals designate like components or portions.

Figure 1:
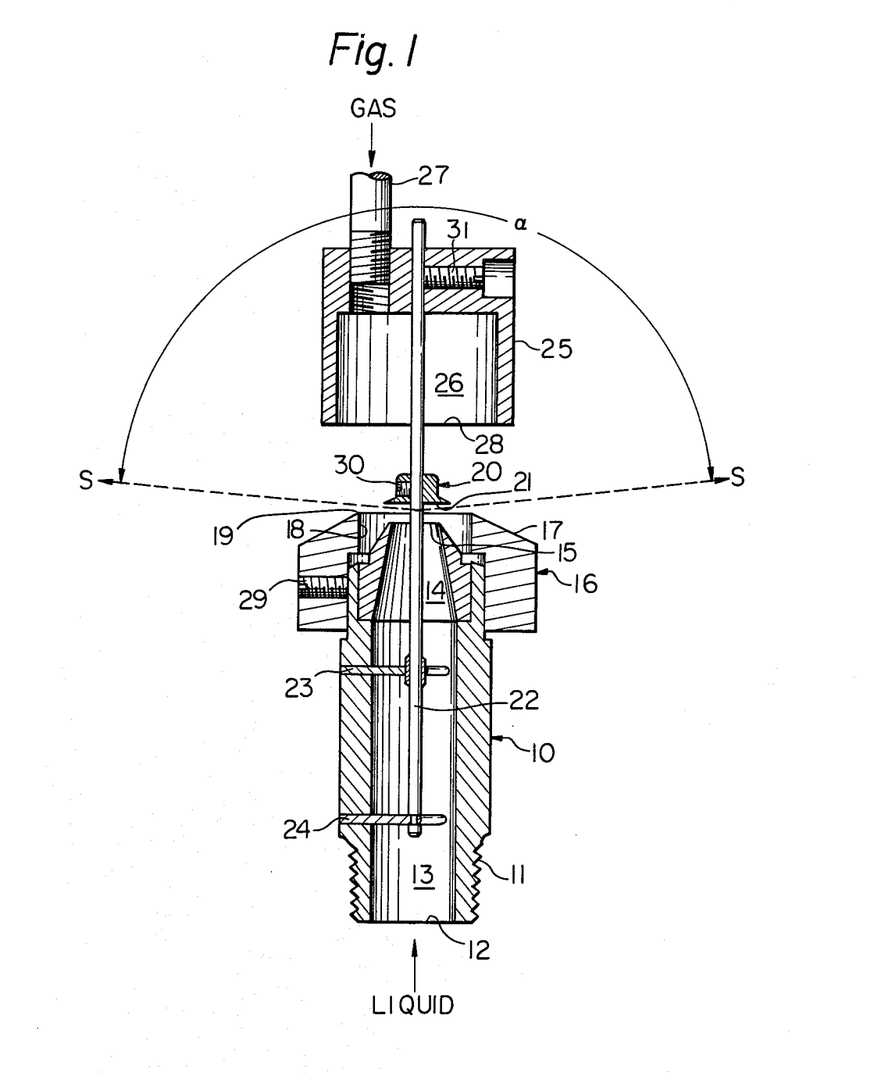
FIG. 1 is a vertical sectional view showing a first embodiment of a bubble generating apparatus according to the present invention.

Referring now to FIG. 1, a liquid spouting nozzle element 10 has a liquid inlet opening 12 and a threaded portion 11 for piping on one end, and a liquid spouting outlet 15 on the other end. A cylindrical liquid flow passageway 13 and a convergent liquid flow passageway 14 are concentrically formed between the liquid inlet opening 12 and the liquid spouting outlet 15. A supporting rod 22 for rigidly supporting an impact disperser 20 at a position confronting the liquid spouting outlet 15 is fixed by front and rear supporting arms 23 and 24 so that the rod 22 lies on the central axis of the nozzle element 10. The supporting rod 22 supports the impact disperser 20 by penetrating therethrough and is extended on the side opposite to the side of an impinging surface 21 of the impact disperser 20, which is located at a position confronting the spouting outlet 15 of the nozzle element 10. The impact disperser 20 is fixed on the supporting rod 22 by a set screw 30. The supporting rod 22 also supports a gas supplier 25 on its extended portion. The gas supplier 25, which is fixed to the supporting rod 22 by a set screw 31, is disposed so that a gas discharge port 28 for discharging a gas, such as compressed air, from a gas chamber 26 of the gas supplier 25 is located at a position confronting the rear face of the impact disperser 20 opposite to the impinging surface 21. The gas supplier 25 has a conduit 27 for introducing the gas into the gas chamber 26 from an appropriate gas supply source (not shown). A dispersion angle adjusting device 16, having a conical surface 17, cylindrical inner wall 18 and an acute angle edge 19 is fitted on the cylindrical outer periphery of the end portion of the nozzle element 10. The dispersion angle adjusting device 16 encircling the spouting outlet 15 is disposed so that the acute angle edge 19 can slide in the axial direction toward and away from the impact disperser 20 when a set screw 29, for fixing the device 16 onto the nozzle element 10, is loosened. It should be understood that, since the impact disperser 20 and the gas supplier 25 are fitted on the supporting rod 22 so that they can slide on the supporting rod 22 in the axial direction, they can be fixed to the rod 22 at appropriate positions by set screws 30 and 31. Thus, after the relative positions of the impact disperser 20 and the spouting outlet 15 of the nozzle element 10 and the relative positions of the gas supplier 25 and the impact disperser 20 have been appropriately adjusted the set screws 30 and 31 are tightened.

The operation of the bubble generating apparatus of FIG. 1 will now be described.

The apparatus is appropriately placed in a liquid in which bubbles inflated by a gas should be generated.

The liquid, which is circulated by a piping (not shown) and pressurized by a suitable pump (not shown), is supplied to the nozzle element 10, from a pipe (not shown) connected to the threaded portion 11, through the liquid inlet opening 12 and is spouted from the liquid spouting outlet 15 after flowing through the passageways 13 and 14. The spouted pressurized liquid violently impinges against the circular-shaped impinging surface 21 of the impact disperser 20 and is then dispersed into the entire liquid portion surrounding the impact disperser 20 in the form of a high-speed dispersion stream S conical in the radial direction with respect to the axis of the nozzle element 10.

By hydrodynamic action, the dispersion stream is caused to have an activity of dragging the surrounding fluid therein and, therefore, a low-pressure region is formed in the liquid around the dispersion stream S. A gas present in the gas chamber 26 is induced into this low-pressure region through the gas discharge port 28 of the gas supplier 25 disposed in this low-pressure region. Accordingly, the induced gas is dragged into the dispersion stream S and is converted to fine bubbles. The liquid is agitated by these fine bubbles and, hence, gas-liquid contact can be accomplished very effectively.

The gas is introduced into the gas chamber 26 as indicated by an arrow through the conduit 27. The distance between the spouting outlet 15 and the impinging surface 21 of the impact disperser 20 is set by sliding the disperser 20 on the supporting rod 22, adjusting the position of the disperser 20 so that a highest spouting pressure is attained in the liquid spouted from the spouting outlet 15 and fixing the disperser 20 by the set-screw 30.

Since the dispersion angle α of the dispersion stream S can be adjusted by moving on the nozzle element 10 the dispersion angle adjusting device 16, after the dispersion angle has been adjusted to a prescribed value, the adjusting device 16 is fixed onto the nozzle element 10 by the set screw 29. The dispersion angle adjusting device 16 may be engaged with the nozzle element 10 by a male and female screw engagement so that fine adjustment of the dispersion angle of the liquid dispersion stream S can be precisely accomplished.

The relative distances between the gas supplier 25 and the impact disperser 20 and between the gas supplier 25 and the dispersion angle adjusting device 16 can be adjusted by moving the gas supplier 25 on the supporting rod 22, so that the gas induction and dragging and the efficient formation of fine bubbles by the dispersion stream S can be accomplished appropriately. When the appropriate position of the gas supplier 25 is set, it is fixed onto the supporting rod 22 by the set screw 31.

Figure 2:
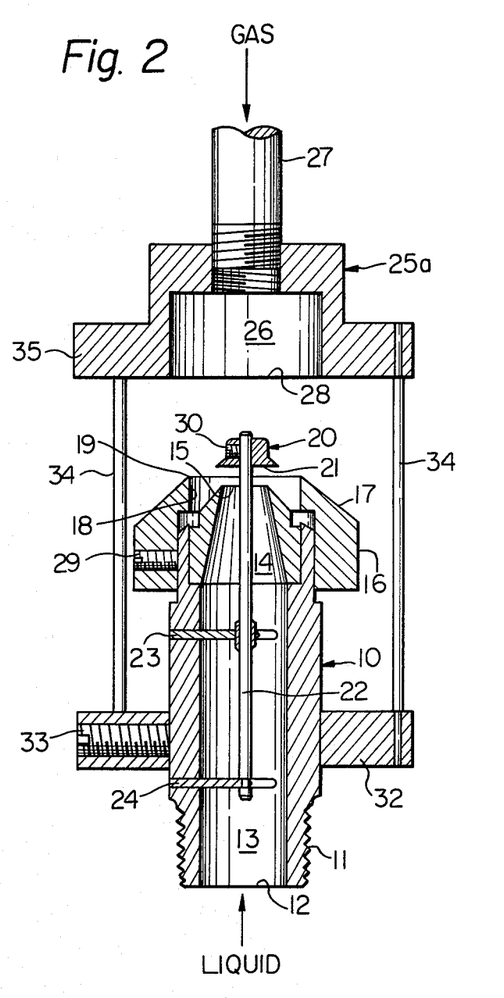
FIG. 2 is a vertical sectional view showing a second embodiment of a bubble generating apparatus according to the present invention.

FIG. 2 shows a second embodiment of a bubble generating apparatus of the present invention.

Although in the first embodiment of FIG. 1, the gas supplier 25 is supported by the supporting rod 22 located at the center of the apparatus, in the embodiment shown in FIG. 2, it should be noted that a gas supplier 25a is connected to the nozzle element 10 by employing a plurality of long supporting columns 34, a fixing plate 32 and a set screw 33. As shown in FIG. 2, the long supporting columns 34 interconnect a flange portion 35 of the gas supplier 25a and the fixing plate 32 which is fixed to the nozzle element 10 by the set screw 33. It should be noted that, since the nozzle element 10 is slidably fitted in a central bore of the fixing plate 32 and fixed by the set screw 33, the distance between the nozzle element 10 and the gas supplier 25a can be adjusted by loosenning the set screw 33 and by sliding the nozzle element 10 in the axial direction. The operation of the second embodiment of FIG. 2 will not be described, however, persons skilled in the art will easily understand that the second embodiment of FIG. 2 operates in a manner identical to that of the first embodiment of FIG. 1.

The third embodiment of a bubble generating apparatus of the present invention will now be described with reference to FIGS. 3 and 3A.

Figure 3:
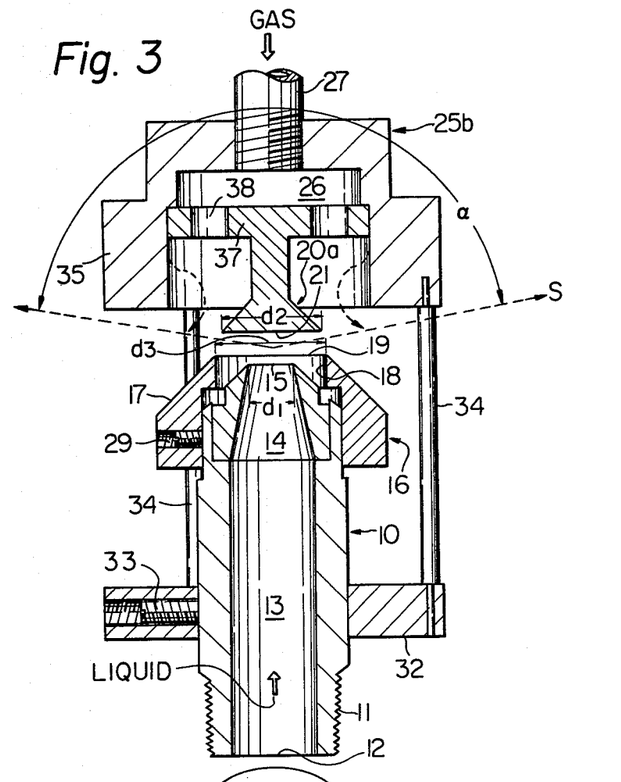
FIG. 3 is a vertical sectional view showing a third embodiment of a bubble generating apparatus according to the present invention.

Referring to FIG. 3, a liquid spouting nozzle element 10, to which a pressurized fluid is supplied from a supply tube passage (not shown), has on one end a male screw portion 11 for connection of the supply tube and a liquid inlet opening 12 and on the other end a liquid spouting outlet 15. A liquid free flow passage 13 and a conical convergent portion 14 are concentrically formed between the fluid inlet 12 and the liquid spouting outlet 15. An impact disperser 20a is disposed to confront the liquid spouting outlet 15 of the nozzle element 10, and this impact disperser 20a has a circular liquid impinging surface 21 and a flange portion 37 formed on the side opposite to the side of the liquid impinging surface 21. As described hereinafter, a number of holes 38 are formed in the flange portion 37 to allow passage of a gas therethrough. The impact disperser 20a is pressed and fitted into a gas chamber 26 of a gas supplier 25b, whereby the impact disperser 20a is fixed. The gas supplier 25b is connected to a gas supplying tube 27 so that a gas is fed from the direction indicated by an arrow into the gas chamber 26. The gas in the gas chamber 26 penetrates through the holes 38 of the impact disperser 20a and is induced and supplied into the region surrounding the impact disperser 20a. On the outer periphery of the end portion of the nozzle element 10 where the liquid spouting outlet 15 is disposed, a dispersion angle adjusting device 16, having a conical surface 17, a cylindrical inner wall 18, and an acute angle edge 19, is fixed by means of a set screw 29. The dispersion angle adjusting device 16 is fitted so that it can slide along the axis of the nozzle element 10 toward the impact disperser 20a if the set screw 29 is loosened and, as a result, the inner wall 18 can, therefore, be advanced and retreated above and below the liquid spouting outlet 15. The nozzle element 10 is fixed to a fixing plate 32 by means of a set screw 33, and when the set screw 33 is loosened, the outlet 15 of the nozzle element 10 can be advanced toward or retreated from the impact disperser 20a. This fixing plate 32 is integrally connected to the gas supplier 25b by a plurality of long supporting columns 34 and, thus, the bubble generating apparatus of this embodiment is constructed as an integral apparatus. In the practical use of this bubble generating apparatus, it was confirmed that if the diameter $d_2$ of the circular impinging surface 21 of the impact disperser 20a is selected to about 1.5 times the diameter $d_1$ of the outlet 15 of the liquid spouting nozzle element 10 and if the diameter $d_3$ of the cylindrical inner wall 18 is selected to 2.0 times the diameter $d_1$, the effect of impact and dispersion of the pressurized fluid can be attained very stably.

Figure 3A:
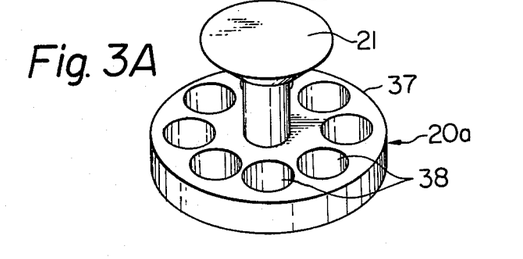
FIG. 3A is a perspective view showing an impact disperser used in the apparatus of FIG. 3.

FIG. 3A is a perspective view of the impact disperser 20a used in the bubble generating apparatus of FIG. 3. From FIG. 3A, it will be understood that a number of large holes 38 for gas are formed on a circumference of the flange portion 37. In the impact disperser 20a shown in FIG. 3A, each gas hole 38 is a round through-hole formed by boring, but various gas holes differing in shape may be formed as required. For example, a plurality of arcuate grooves may be formed on the circumference so as the enhance induction of the gas. Further, it should be understood that the impact disperser 20a is fixed and attached to the gas chamber 26 of the gas supplier 25b (FIG. 3) by a forcible fitting method, for example, a press fit or shrinkage fit. It is, of course, possible to employ the fitting method in which a male screw thread is formed on the outer periphery of the flange portion 37 and engaged with a female screw thread formed on the inner circumferential wall of the gas chamber 26 of the gas supplier 25b.

The operation of the third embodiment of a bubble generating apparatus of the present invention having the construction shown in FIGS. 3 and 3A will now be described.

The bubble generating apparatus is disposed in a liquid, and a pressurized liquid is supplied into the liquid spouting nozzle element 10 through the inlet opening 12 from a pipe (not shown) connected to the screw portion 11 in the direction indicated by an arrow in FIG. 3 by means of a pump or the like (not shown). The pressurized liquid is spouted from the outlet 15 by way of the cylindrical passageway 13 and the convergent passageway 14. The spouted pressurized liquid impinges against the circular impinging surface 21 of the impact disperser 20a and is dispersed over the entire circumference of the disperser 20a in the form of a dispersion stream S expanding uniformly and conically. Since the dispersion stream S acts so as to drag therein the fluid present around it by virtue of hydrodynamic action, a low-pressure region is formed around the dispersion stream S and from the gas holes 38 of the gas supplier 25b disposed in this low-pressure region the gas in the gas chamber 26 is sucked out. The sucked gas is then dragged into the dispersion stream S and dispersed in the liquid in the form of fine bubbles, and these fine bubbles agitate the liquid, whereby the gas-liquid contact can be accomplished effectively. As pointed out hereinbefore, the diameter $d_2$ of the impinging surface 21 of the impact disperser 20a is adjusted to about 1.5 times the diameter $d_1$ of the spouting outlet 15 of the nozzle element 10. This arrangement is made so as to stabilize this dispersion stream. The gas is supplied into the gas chamber 26 through the gas conduit pipe 27 as indicated by an arrow in FIG. 3. The distance between the spouting outlet 15 and the impinging surface 21 of the impact disperser 20a is set by moving the nozzle element 10 toward the impact disperser 20a or retreating the nozzle element 10 therefrom to adjust the position of nozzle element 10 so that the spouting pressure of the pressurized liquid from the spouting outlet 15 is highest and most stable and, then, fixing the nozzle element 10 at this adjusted position to the fixing plate 32 by the set screw 33. Of course, it is possible to first select the above position of the nozzle element 10, fix the nozzle element 10 to the fixing plate 32 and then locate the bubble generating apparatus in the liquid.

The dispersion angle $\alpha$ of the dispersion stream S can be adjusted by moving on the liquid spouting nozzle element 10 along the direction of the axis thereof the dispersion angle device 16 having the acute angle edge 19 and the cylindrical wall 18. Therefore, after the position of the device 16 has been adjusted so as to attain a desirable dispersion angle, the device 16 is fixed onto the liquid spouting nozzle element 10 by means of the set screws 29. In order to make this adjustment minutely, the nozzle element 10 may be engaged with the dispersion angle adjusting device 16 by means of engaging screws (not shown) having a very fine pitch.

By moving the nozzle element 10 in the vertical direction with respect to the fixing plate 32 as described above, the relative distances among the gas supplier 25b, the impact disperser 20a and the dispersion angle adjusting device 16 can be adjusted so that each of the actions of sucking the gas out, dragging the gas into the dispersion stream S and generating fine bubbles by the dispersion stream S can be performed efficiently. An important feature of the bubble generating apparatus of this third embodiment having the above operation is that, since both the cylindrical passage 13 and convergent passageway 14 of the nozzle element 10, for spouting the pressurized liquid to the impinging surface 21 of the impact disperser 20a, are formed into a linearly extending free passageway having therein no hindrance, there is no risk of clogging even if foreign substance is contained in the spouted pressurized liquid. Further, since the construction of the first or second embodiment shown in FIG. 1 or 2, in which the impact disperser 20 is held and supported by means of a supporting rod 22 and supporting arms 23 and 24 disposed within the flow passageway of the nozzle element 10, is not adopted in the bubble generating apparatus of the present third embodiment, the risk of such supporting rod and arms being subjected to damage caused by abrasion of foreign substances contained in the spouted pressurized liquid can be completely avoided.

Figure 4:
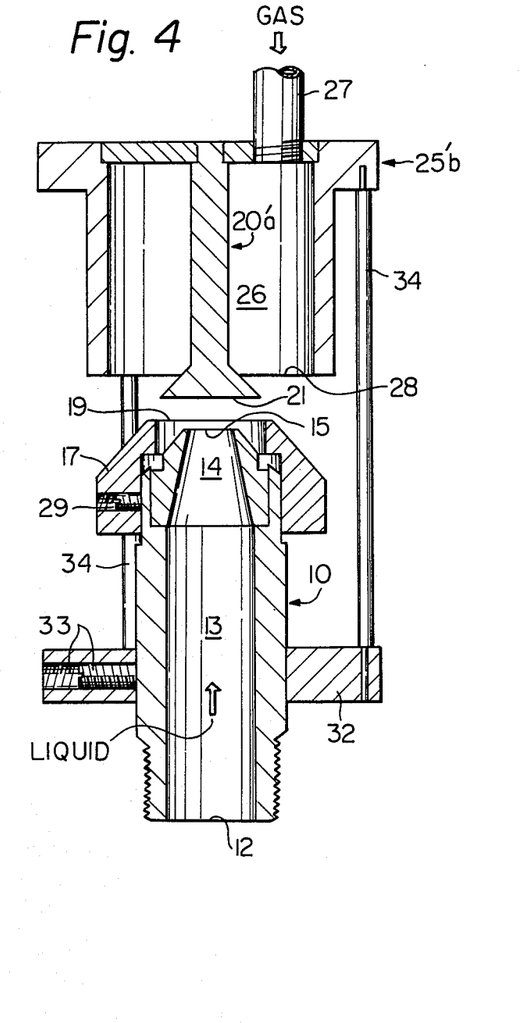
FIG. 4 is a vertical sectional view showing a fourth embodiment of a bubble generating apparatus according to the present invention.

FIG. 4 shows a fourth embodiment of the present invention in which the impact disperser 20a and the gas supplier 25b of the third embodiment of FIGS. 3 and 3A are modified into an impact disperser 20a' with no flange and a gas supplier 25b' having therein a deep cylindrical gas chamber 26. It will be understood that the deep cylindrical gas chamber 26 of the gas supplier 25b' enables the gas, which has come from the gas conduit pipe 27, to smoothly flow toward the gas discharge port 28 without being subjected to any resistance. Thus, when the bubble generating apparatus of the present invention is operating, the gas in the gas chamber 26 is easily dragged into the dispersion stream S (see FIG. 3) and then converted into fine bubbles. Further, in this fourth embodiment, the axial depth of the gas chamber 26 is appreciably increased in comparison with every one of the previous embodiments. This deep construction of the gas chamber 26 of the gas supplier 25b' brings about a particular advantage as explained below. That is to say, when the apparatus is used by immersing it into a liquid and when the supply of the pressurized gas is interrupted from the gas conduit pipe 27, the liquid present around the apparatus often flows toward the gas conduit pipe 27 through the gas chamber 26, due to the elimination of the pressure of the pressurized gas. Therefore, if the liquid contains any foreign substance therein, said foreign substance will become attached to the inner wall of the gas conduit pipe 27 and will cause clogging of said pipe 27. However, it was confirmed by the present inventor that by increasing the axial depth of the gas chamber 26 of the gas supplier; the above-mentioned flowing of the liquid directed into the gas conduit pipe 27 can be effectively prevented. As a result, clogging of the gas conduit pipe 27 is avoided even if the liquid contains a foreign substance, such as a fibrous material.

Figure 5:
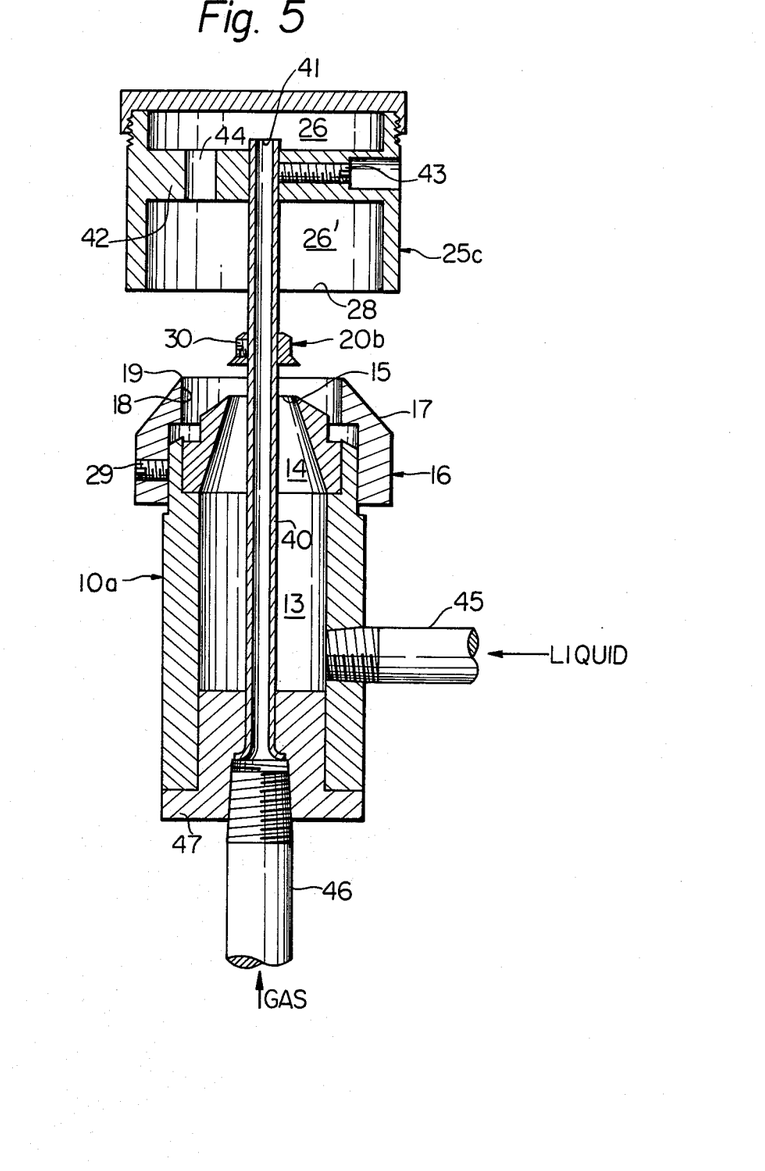
FIG. 5 is a vertical sectional view showing a fifth embodiment of a bubble generating apparatus according to the present invention.

FIG. 5 shows a fifth embodiment of the present invention.

In this fifth embodiment, an impact disperser 20b and a gas supplier 25c are mounted on a tubular gas supply conduit 40 arranged so as to extend through the central axis of a liquid spouting nozzle element 10a. A plug 47 is fitted on one end of the nozzle element 10a and this plug 47 holds the gas supply conduit 40 so that the nozzle element 10a, the impact disperser 20b and the gas supplier 25c form a single assembly of a bubble generating apparatus. The impact disperser 20b is positioned at the middle of the gas supply conduit 40 and the gas supplier 25c is attached to a position adjacent to the top end of the gas supply conduit 40. A plate 42 having a plurality of gas holes 44 is provided in the interior of the gas supplier 25c between an upper gas chamber 26 and a lower gas chamber 26'. Thus both chambers 26 and 26' are intercommunicated through the gas holes 44 of the plate 42. The gas supplier 25c is fixed onto the gas supply conduit 40 by a set screw 43 engaged in the plate 42. A gas discharge port 28 is located at a position confronting the impact disperser 20b so that gas discharged from the discharge port 28 is guided to the region surrounding the impact disperser 20b. In this fourth embodiment, since the plug 47 is disposed on the end of the nozzle element 10a, the pressurized liquid is supplied from the periphery of the nozzle element 10a through a liquid supply conduit 45 as indicated by an arrow. Further, the gas is fed from a gas supply source (not shown) to the gas supplier 25c through the gas supply conduit 40.

Figure 6:
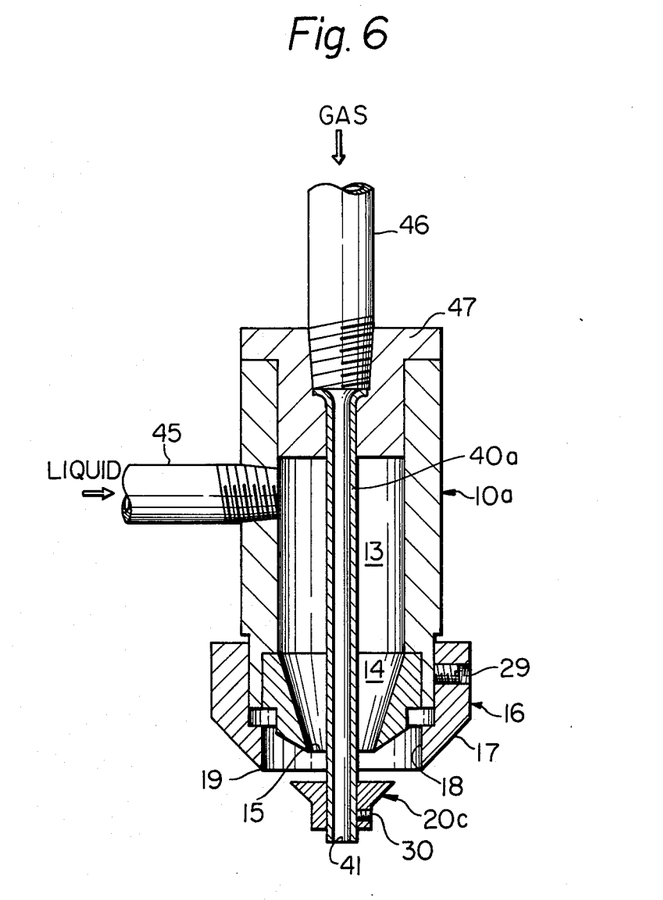
FIG. 6 is a vertical sectional view showing a sixth embodiment of a bubble generating apparatus according to the present invention.

FIG. 6 shows a sixth embodiment of the present invention in which a pressurized liquid is spouted downwardly from above. An impact disperser 20c is held by a gas supply conduit 40a arranged so as to extend through the central axis of the nozzle element 10a. The impact disperser 20c is fixed onto the gas supply conduit 40a by a set screw 30. Thus, when the set screw 30 is loosened and the impact disperser 20c is appropriately moved in the vertical direction with respect to the spouting outlet 15 of the nozzle element 10a, the dispersion angle of the dispersion stream of the pressurized liquid can be appropriately adjusted as in the case of the foregoing five embodiments. The gas supply conduit 40a penetrates through the impact disperser 20c and is projected downwardly to some extent as shown in FIG. 6. As a result, the gas supplied and discharged from the lowermost open end 41 of the gas supply conduit 40a into the liquid in which the bubble generating apparatus is immersed, rises in said liquid and is dragged into the dispersion stream of the pressurized liquid generated by the impact disperser 20c, whereby fine bubbles are effectively generated in the liquid surrounding the bubble generating apparatus.

A sealing plug 47 is mounted on the top end of the nozzle element 10a and this plug 47 holds the gas supply conduit 40a in a state wherein it is suspended along the central axis of the nozzle element 10a. In this embodiment, since the plug 47 is mounted on the top end of the nozzle element 10a, the pressurized liquid is supplied into the flow passage 13 through a liquid supply conduit 45 from the side of the nozzle element 10a. Desirably, the liquid supply conduit 45 is attached to the side of the nozzle element 10a, so that the axis of the conduit 45 and the central axis of the nozzle element 10 intersect. One of the characteristic features of the present embodiment is that, since the spouting outlet 15 of the liquid spouting nozzle element 10 is directed downwardly so that the pressurized liquid is spouted downwardly to the impact disperser 20c, and also since the gas is supplied to the region surrounding the impact disperser 20c from above by means of the gas supply conduit 40a, the gas supply conduit 40a alone can constitute a gas supply means. Thus, the entire construction of the present fifth embodiment can be very simple compared with those of the previous embodiments. Also, in the present sixth embodiment of FIG. 6, since the pressurized liquid fed in the direction of an arrow from the liquid supply conduit 45 is introduced into the interior of the nozzle element 10a and flows linearly toward the outlet 15 through the passageways 13 and 14 having an annular section, there is no risk of clogging even if the pressurized liquid contains therein a foreign material. Further, since the bubble generating apparatus of this sixth embodiment is immersed into a liquid container or tank from above and fixed in the interior of the container by appropriate fixing means, no particular processing, such as boring the liquid tank for provision of the bubble generating apparatus, is needed. Therefore, the present sixth embodiment is particularly advantageous when the bubble generating apparatus is attached to an existing liquid tank containing a liquid in which bubbles should be generated.

Figure 7:
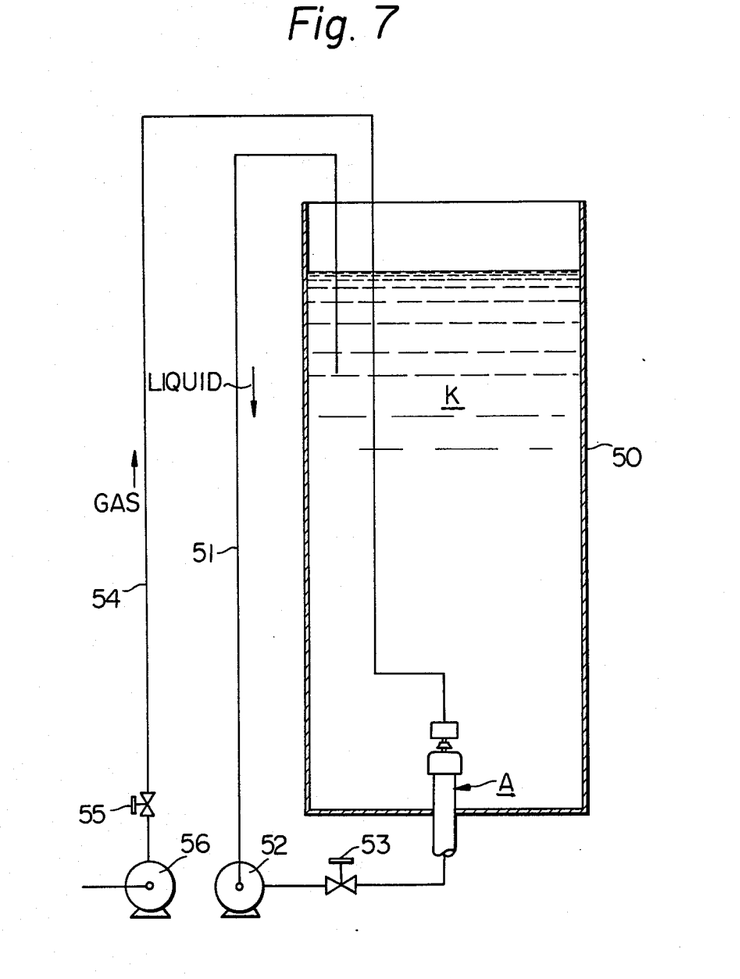
FIG. 7 is a diagrammatic view showing an example of application of the bubble generating apparatus according to the present invention.

FIG. 7 illustrates an example of the application of the bubble generating apparatus according to the present invention.

Referring now to FIG. 7, the bubble generating apparatus A of the present invention is disposed in the bottom portion of an open type gas-liquid contact oxidation tank 50 having a diameter of 200 mm and a height of 2000 mm. A sodium sulfite solution K in the tank 50 is taken out through a liquid pipe 51 by means of a liquid pump 52, and it is recycled through a flow rate control valve 53. The pressurized solution K thus recycled is supplied to the apparatus A in the bottom of the tank 50 and is dispersed at a dispersion angle of 180°. Air is supplied through an air pipe 54 and a flow rate control valve 55 by means of an air pump 56. Thus, air is bubbled and dispersed by the dispersion stream and the liquid in the tank is agitated by the bubbles. The ratio of the amount recycled of the solution, namely the amount of the solution dispersed from the spouting outlet, to the amount of air supplied can be changed instantaneously and freely by operating the liquid flow rate control valve 53 and the gas flow rate control valve 55. In the example shown in FIG. 7, an oxygen migration coefficient of 800 to 900 $hr^{-1}$ to the sodium sulfite solution can be obtained at a superficial gas velocity in a column of 4 cm/sec.

Figure 8:
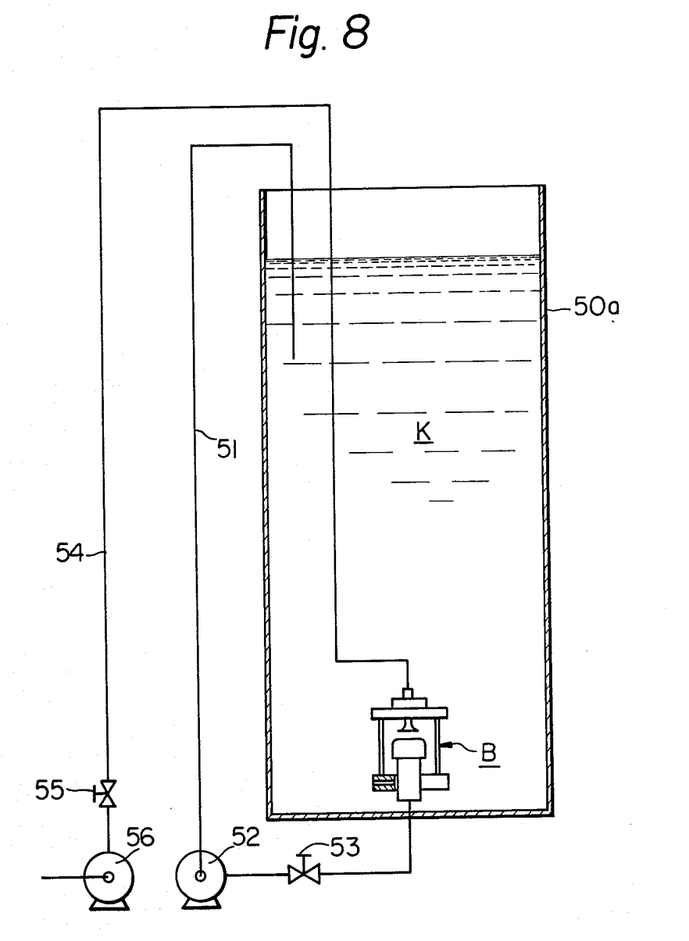
FIG. 8 is a diagrammatic view showing another example of application of the bubble generating apparatus according to the present invention.

FIG. 8 illustrates another example of the application of the bubble generating apparatus according to the present invention.

In FIG. 8, the bubble generating apparatus B of the present invention is disposed in the bottom of an open type gas-liquid contact oxidation tank 50a having a diameter of 500 mm and a height of 2000 mm. A sodium sulfite solution K in the tank 50a is taken out from the upper portion of the tank through a liquid pipe 51 by means of a liquid pump 52 and is recycled through a flow rate control valve 53 and dispersed at a dispersion angle of 180°. Air is supplied through a flow rate control valve 55 and an air pipe 54 by means of an air pump 56. In this manner, the liquid in the tank is agitated by air bubbles formed and dispersed by the liquid dispersion stream. The ratio of the amount recycled of the solution K, namely the amount of the solution dispersed from the spouting outlet of the nozzle element, to the amount of air supplied can be instantaneously changed by operating the liquid flow rate control valve 53 and the gas flow rate control valve 55. In the example illustrated in FIG. 8, when the gas-liquid contact oxidation is carried out in the open state at a superficial gas velocity in a column of 1.3 cm/sec., the rate of oxidation of the sodium sulfite solution (maintained at 10° C) is about two times as high as the oxidation rate obtained when bubbles are generated by using a commercially available aeration apparatus of the perforated plate type.

According to the present invention, the structure of the bubble generating apparatus can be remarkably simplified, and by a mechanically easy operation and installation, fine bubbles can be generated and dispersed in an optional direction and in an optional amount. Therefore, the gas-liquid contact area can be increased. Further, since convections are formed in the liquid because apparent differences of the specific gravity are caused in the liquid by the dispersion stream and fine bubbles, the agitating and mixing effect is further enhanced. Furthermore, by appropriately selecting the amount of the supplied gas depending on the force of inducing the gas from the gas supplier by pressure reduction in the area surrounding the gas-inducing port, which gas is generated and determined by the quantity of the dispersion stream and the dispersion angle, the direction of the resultant force of the following two component forces, that is, the dispersion stream component force of which the direction will be basically determined by an axial position of the dispersion angle adjusting device 16 and the buoyancy component force of the bubbles in the dispersion stream, can be changed in a vibrating manner due to a small change in the magnitude of one or both of the above two component forces to thereby change the dispersion angle and impart a vibrating phenomenon to the dispersion stream, whereby the bubbles are made further finer and the agitation effect can be remarkably enhanced over the conventional techniques. Therefore, when the bubble generating apparatus of the present invention is employed, a gas-liquid contact oxidation, for example, a chemical oxidation, is remarkably promoted, and supply of oxygen or other gas necessary for cultivation of microorganisms and supply of oxygen to fish farming ponds can be effectively accomplished. Moreover, the apparatus of the present invention can be broadly used as simple means for attaching fine particles of a solid or gas present in a liquid to bubbles or replacing such fine particles with bubbles to thereby separate the fine particles from the liquid or for performing other operations requiring fine bubbles.

The apparatus of the present invention may be installed in both stationary and flowing liquids in which the generation of bubbles is required, and a plurality of the apparatus of the present invention may be disposed according to need. The liquid and gas fed to the apparatus of the present invention can be supplied independently through suitable compressing means such as pumps and flow rate control valves in optional quantities at optional mixing ratios. Still further, the apparatus of the present invention can be used in both high-temperature and low-temperature liquids, and it can also be used in a pressurized liquid vessel.

Still further in addition, when the apparatus of the present invention is attached to a previously built liquid vessel or a newly made liquid vessel, even if such an operation as the formation of holes in the bottom of the liquid vessel or the change of the shape of the liquid vessel is impossible, the apparatus of the present invention can easily be set in the vessel merely by inserting the apparatus into the vessel from above and disposing liquid and gas supply tubes into the interior of the vessel from the upper portion of the liquid.

In the case where the dispersion stream is not to be uniformly dispersed along the entire circumference of the impact disperser but the dispersion stream is to be dispersed concentratedly and asymmetrically in a specific direction, the shape of the impinging surface of the impact disperser is changed to a non-circular appropriate shape or the gas holes of the gas supplier are formed so that large quantities of bubbles are generated in the desired direction.

The apparatus of the present invention has no mechanically rotating and sliding members and parts, and the diameter of the liquid spouting outlet can be made larger than that of the conventional nozzle element having no impact disperser. By virtue of these structural features, in addition to the above effect of the linear free passage in the nozzle, troubles caused by clogging can be substantially and completely prevented and, therefore, maintenance can be remarkably facilitated and the life of the apparatus can be greatly prolonged.

What is claimed is:

1. An apparatus for generating bubbles in a liquid, comprising, in combination:
    a nozzle element having a liquid inlet for introducing therein a pressurized liquid and an outlet arranged to be spaced apart from the liquid inlet for spouting the pressurized liquid;
    an impact disperser means having a liquid impinging surface for causing a stream of the pressurized liquid spouted from the outlet of said nozzle element to impact against said impinging surface and for generating a dispersing stream of said pressurized liquid directed into the liquid, thereby forming a low pressure region in said liquid around the dispersing stream of said pressurized liquid, and;
    a gas supply means for supplying and guiding a gas to a region surrounding the impact disperser means, thereby causing said gas to be dragged into the low pressure region in said liquid, said gas supply means including means for fixedly mounting therein said impact disperser means, said mounting means of said gas supply means including a flange means having therein a mounting bore in which a flange means of said gas supply means is fixedly fitted and a connecting means for connection between said gas supply means and said nozzle element.

2. An apparatus for generating bubbles in a liquid, comprising, in combination:
    a nozzle element having a liquid inlet for introducing therein a pressurized liquid, a conical convergent flowing zone for accelerating and concentrating said pressurized liquid, and a circular outlet spaced apart from the liquid inlet at the extreme end of said flowing zone for spouting said accelerated and concentrated pressurized liquid;

an impact disperser means having a flat liquid impinging surface spaced apart from said circular outlet for causing a collision of said spouted pressurized liquid with said impinging surface and for forcedly generating a violently turbulent dispersing flow of said spouted pressurized liquid directed into the liquid, thereby forming a low pressure region in said liquid around said dispersing flow of said spouted pressurized liquid, and;

a gas supply means for supplying and guiding a gas to a region surrounding the impact disperser means, thereby causing said gas to be dragged into the low pressure region in said liquid and to be atomized and mixed into said dispersing flow effectively and uniformly.

3. A bubble generating apparatus as claimed in claim 2, further comprising means for adjustably changing axial distances between said nozzle element and said impact disperser means.

4. A bubble generating apparatus as claimed in claim 2, wherein said gas supply means includes means for fixedly mounting therein said impact disperser means, and a connecting means for connection between said gas supply means and said nozzle element.

5. An apparatus for generating bubbles in a liquid, comprising, in combination:

a nozzle element having a liquid inlet for introducing therein a pressurized liquid, an outlet arranged to be spaced apart from the liquid inlet for spouting the pressurized liquid and means for adjusting the direction of a dispersing stream of said pressurized liquid;

an impact disperser means having a liquid impinging surface for causing a stream of the pressurized liquid spouted from the outlet of said nozzle element to impact against said impinging surface and for generating said dispersing stream of said pressurized liquid directed into the liquid, thereby forming a low pressure region in said liquid around the dispersing stream of said pressurized liquid, and;

a gas supply means for supplying and guiding a gas to a region surrounding the impact disperser means, thereby causing said gas to be dragged into the low pressure region in said liquid.

6. A bubble generating apparatus as claimed in claim 5, wherein said adjusting means comprises a hollow cylindrical element axially and movably mounted on said nozzle element, said hollow cylindrical element having an acute angle end forming an encircling wall around said outlet of said nozzle element.

7. An arrangement for generating bubbles in a liquid employing at least one bubble generating apparatus including a nozzle element having a liquid inlet for introducing therein a pressurized liquid and an outlet arranged to be spaced apart from the liquid inlet for spouting the pressurized liquid, an impact disperser means having a liquid impinging surface for causing a stream of the pressurized liquid spouted from the outlet of said nozzle element to impact against said impinging surface and for generating a dispersing stream of said pressurized liquid directed into the liquid, thereby forming a low pressure region in said liquid around the dispersing stream of said pressurized liquid, and, a gas supply means for supplying and guiding a gas to a region surrounding the impact disperser means, thereby causing said gas to be dragged into the low pressure region in said liquid, said arrangement comprising:

a container means for containing the liquid in which bubbles are to be generated;

means for installing the bubble generating apparatus in a bottom portion of said container means;

a first piping means for recycling the liquid in said container means to said bubble generating apparatus under a predetermined pressure;

a pressurizing means located in said first piping means for providing said recycling liquid with the predetermined pressure;

a liquid flow control valve means located in said first piping means between said pressurizing means and said bubble generating apparatus;

a second piping means for supplying gas to said bubble generating apparatus under a predetermined pressure;

a compressing means located in said second piping means for compressing the gas to the predetermined pressure level, and;

a gas flow control valve means located in said second piping means between said compressing means and said bubble generating apparatus.

8. An arrangement as claimed in claim 7, wherein a plurality of said bubble generating apparatus is disposed in said bottom portion of said liquid container means so that said generating apparatus are equidistantly spaced apart from one another.

9. An arrangement as claimed in claim 7, wherein said pressurizing means is a liquid pump.

* * * * *